(12) United States Patent
Sharma et al.

(10) Patent No.: US 9,791,975 B2
(45) Date of Patent: Oct. 17, 2017

(54) COMPUTING DEVICE, APPARATUS AND SYSTEM FOR DISPLAY AND INTEGRATED PROJECTION

(75) Inventors: Sameer Sharma, Santa Clara, CA (US); Kun Hung Liang, Taipei (TW); Cheng Tsung Lin, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 639 days.

(21) Appl. No.: 13/976,975

(22) PCT Filed: Mar. 31, 2012

(86) PCT No.: PCT/US2012/031752
§ 371 (c)(1),
(2), (4) Date: Jun. 27, 2013

(87) PCT Pub. No.: WO2013/147907
PCT Pub. Date: Oct. 3, 2013

(65) Prior Publication Data
US 2013/0335379 A1   Dec. 19, 2013

(51) Int. Cl.
| | |
|---|---|
| G06F 3/042 | (2006.01) |
| G06F 1/16 | (2006.01) |
| G06F 3/0484 | (2013.01) |
| G03B 21/14 | (2006.01) |
| H04N 9/31 | (2006.01) |

(52) U.S. Cl.
CPC .......... *G06F 3/042* (2013.01); *G03B 21/145* (2013.01); *G06F 1/1639* (2013.01); *G06F 1/1673* (2013.01); *G06F 3/0425* (2013.01); *G06F 3/04842* (2013.01); *H04N 9/3173* (2013.01); *H04N 9/3194* (2013.01)

(58) Field of Classification Search
CPC ....................................................... G06F 3/042
See application file for complete search history.

(56) References Cited

U.S. PATENT DOCUMENTS

| | | | | |
|---|---|---|---|---|
| 4,545,768 | A * | 10/1985 | Hinnen | ......................... 434/304 |
| 5,796,822 | A * | 8/1998 | Larson | ................... H01Q 1/084 |
| | | | | 379/433.02 |
| 8,104,900 | B2 * | 1/2012 | Nozaki et al. | ................... 353/79 |
| 2002/0075239 | A1 | 6/2002 | Potkonen | |
| 2002/0181722 | A1 * | 12/2002 | Hibino | .................... G06F 1/162 |
| | | | | 381/92 |

(Continued)

OTHER PUBLICATIONS 2.4Ghz Wireless Video Monitoring system user Manual DXR-5, infant Optics 2011.*

(Continued)

*Primary Examiner* — Michael Faragalla
*Assistant Examiner* — Scott Au

(57) ABSTRACT

Embodiments of an apparatus and system are described for a hybrid computing device. Some embodiments may comprise a computing device having an enclosure arranged to support a display on a front of the enclosure, a projector adjustment ring integrated into a portion of the perimeter of the enclosure, and a projector module adjustably coupled to the projector adjustment ring. In various embodiments, the projector module may be arranged for dual-axis rotation within the projector adjustment ring. Other embodiments are described and claimed.

30 Claims, 12 Drawing Sheets

(56) References Cited

U.S. PATENT DOCUMENTS

| | | | |
|---|---|---|---|
| 2003/0210224 A1* | 11/2003 | Bartholomew | G06F 1/1615 345/156 |
| 2007/0097611 A1* | 5/2007 | Takamori | F16M 11/12 361/679.04 |
| 2008/0018591 A1* | 1/2008 | Pittel et al. | 345/156 |
| 2008/0186414 A1 | 8/2008 | Pan | |
| 2009/0033877 A1* | 2/2009 | Choi | G03B 21/26 353/36 |
| 2010/0190524 A1 | 7/2010 | Morozumi | |
| 2010/0317399 A1* | 12/2010 | Rodriguez | 455/556.1 |
| 2011/0286170 A1 | 11/2011 | Liu | |

OTHER PUBLICATIONS

International Search Report and Written Opinion, Mailed Date: Nov. 7, 2012, Application No. PCT/US2012/031752, Filed Date: Mar. 31, 2012, pp. 9.

* cited by examiner

COMPUTING DEVICE, APPARATUS AND SYSTEM FOR DISPLAY AND INTEGRATED PROJECTION

BACKGROUND

The performance and capabilities of modern computing systems have increased rapidly in recent years. Many computing systems today include one or more processors, memory, wireless connectivity, displays and other components requiring electrical power. The number and type of capabilities and components in modern computing systems continue to increase while the systems continue to decrease in size, resulting in limited space for the different components necessary to implement the increased capabilities and diverse usage scenarios. Moreover, modern mobile computing systems are often used in a variety of different locations and usage scenarios which require ergonomically designed systems capable of offering standard computing functionality in addition to advanced options for displaying and interacting with information and graphical user interfaces to ensure a satisfactory and dynamic user experience. As a result, it is desirable to improve mobile computing device designs. Consequently, there exists a substantial need for techniques to adapt mobile computing devices to accommodate components such as an integrated projector in an ergonomically efficient design.

DETAILED DESCRIPTION

The embodiments are generally directed to a computing device, apparatus and system. Various embodiments provide a system and apparatus that include an enclosure arranged to support a display on a front of the enclosure, a projector adjustment ring integrated into a portion of a perimeter of the enclosure, and a projector module adjustably coupled to the projector adjustment ring. In some embodiments, the projector module may be arranged for dual-axis rotation within the projector adjustment ring. Other embodiments are described and claimed.

The processing power and capabilities of modern mobile computing devices continue to increase, often resulting in increased functionality requirements. For example, in some embodiments it may be advantageous for a mobile computing device to include one or more input devices to allow for data entry and device control. Currently available input devices do not provide a good user experience and typing or performing other interactive actions on a display screen may be ergonomically uncomfortable. Moreover, Bluetooth keyboards and other currently available input devices may be cumbersome for a user to transport.

Additionally, as the requirements for smaller devices with multifunction form factors continue to increase, it may be advantageous for computing devices to include one or more output devices to provide additional functionality, such as projecting information using an integrated projector and/or displaying information on an integrated display. Currently available computing devices are generally limited to a single output option which may hinder the user experience and may fail to harness the full computing power of currently available devices. Therefore, some embodiments described herein are directed to techniques for a computing device, apparatus, system and method for display and integrated projection. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
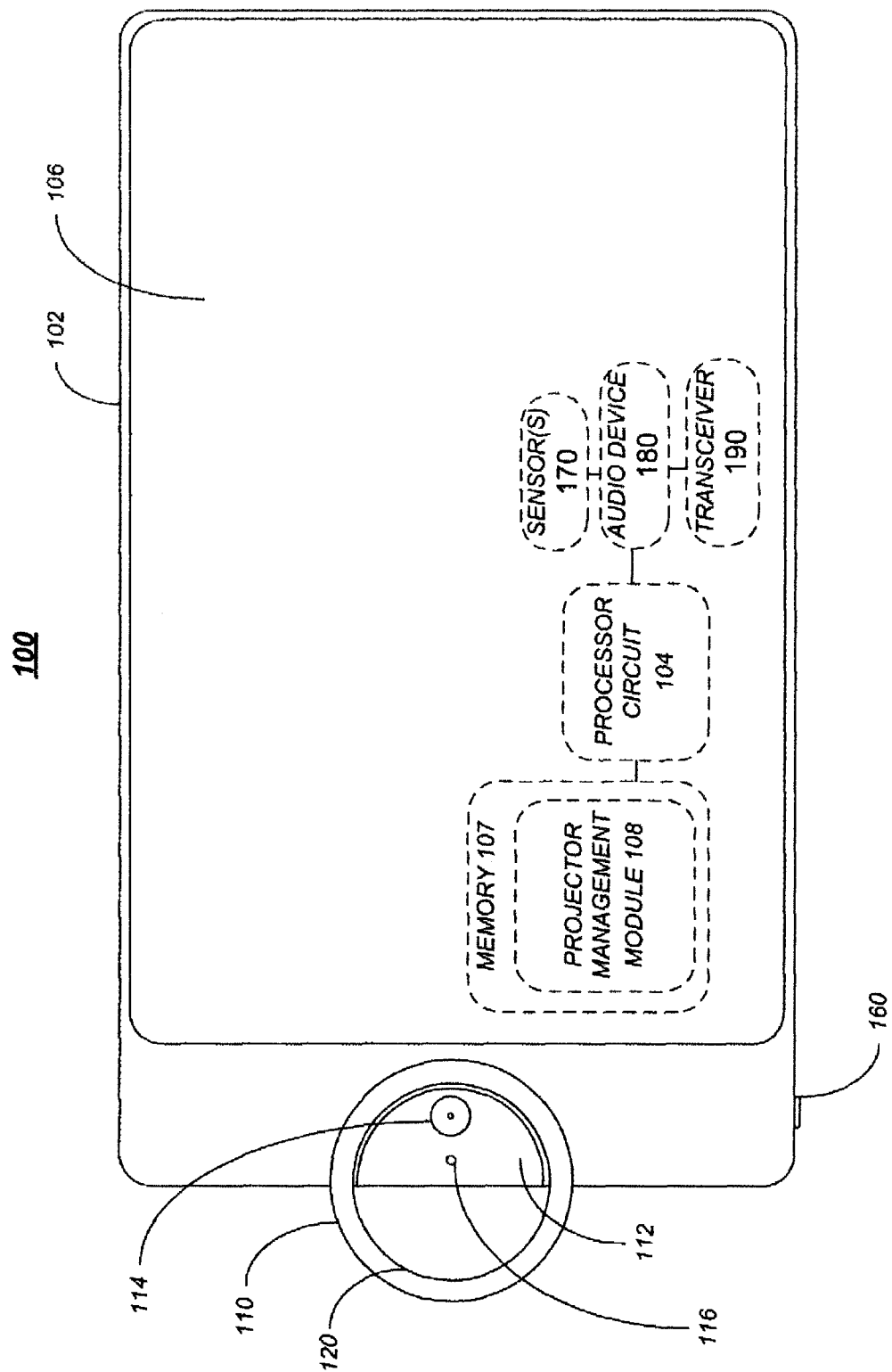
FIG. 1 illustrates one embodiment of a first system.

FIG. 1 illustrates one embodiment of a mobile computing device or system 100. In various embodiments, the mobile computing device 100 (also interchangeably referred to herein as a computing device) may comprise multiple nodes, elements or components. A node, element or component generally may comprise any physical or logical entity in the mobile computing device 100 and may be implemented as hardware, software, or any combination thereof, as desired for a given set of design parameters or performance constraints. Although FIG. 1 may show a limited number of nodes, elements and components by way of example, it can be appreciated that more or less nodes, elements or components may be employed for a given implementation.

In various embodiments, the mobile computing device 100 may comprise a tablet computer, handheld computer, laptop computer, clamshell computer, netbook computer, ultra-book computer, personal digital assistant (PDA), cellular telephone, combination cellular telephone/PDA, smartphone, portable computer, pager, messaging device, media player, digital music player, or other suitable computing device. Various embodiments described herein include reference to a tablet computing device including a combination display output device and an integrated projector. The embodiments are not limited in this context.

Mobile computing device 100 may comprise a device operative to form part of a wired communications system, a wireless communications system, or a combination of both. For example, the mobile computing device 100 may comprise one or more nodes arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile computing device 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The mobile computing device 100 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The mobile computing device 100 may communicate, manage, or process information in accordance with one or more protocols. A protocol may comprise a set of predefined rules or instructions for managing communication among nodes. In various embodiments, for example, a communications system may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the mobile computing device 100 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, mobile computing device 100 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, mobile computing device 100 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, mobile computing device 100 illustrates one possible computing device in some embodiments. In various embodiments, mobile computing device 100 may include enclosure 102, a processor circuit 104, display 106, memory 107, projector management module 108, projector adjustment ring 110, projector module 112, projector 114, camera 116, integrated input/output (I/O) device(s) 160, sensor(s) 170, audio device 180 and transceiver 190. While not shown in FIG. 1, in some embodiments the mobile computing device 100 may include one or more additional or alternative platform component(s). While a limited number and arrangement of components are shown in FIG. 1 for purposes of illustration, it should be understood that mobile computing device 100 may include any number or arrangement of components and still fall within the described embodiments. As such, the embodiments are not limited to the elements or the configuration shown in this figure. Additional components for mobile computing device 100 are discussed in further detail below with reference to FIG. 12.

Mobile computing device 100 may include one or more processor circuits 104 in some embodiments. A processor or processor circuit 104 may comprise any suitable electric device, semiconductor device, system on chip or other component in some embodiments. For example, a processor circuit 104 may comprise a multi-core processor in various embodiments. In some embodiments, a processor circuit 104 may include or comprise one or more radio modules or combination transmitter/receiver (e.g. transceiver) devices. In various embodiments, the transceiver device 170, shown separately in FIG. 1 for purposes of illustration and not limitation, may comprise a device that has both a transmitter and a receiver that are combined and share common circuitry or a single housing. For example, in some embodiments, the transceiver 170 may be operative to enable wireless communication capabilities for mobile computing device 100. Other embodiments are described and claimed.

Mobile computing device 100 may include memory 107 in some embodiments. The memory 107 may comprise any suitable physical device operative to store data, programs, sequences of instructions or other information on a temporary or permanent basis for use in mobile computing device 100 in some embodiments. For example, memory 107 may comprise volatile or non-volatile memory, RAM, ROM, virtual memory, solid state disk drive or a hard disc drive for example. The embodiments are not limited in this context.

In various embodiments, mobile computing device 100 may include one or more sensors 170. The one or more sensors 170 may comprise one or more of a camera, accelerometer, proximity sensor, light sensor, compass or global positioning system (GPS) in some embodiments. The one or more sensors 170 of mobile computing device 100 may be arranged to provide various different functionality for the device 100, such as tilt sensing, rotating one or more user interface elements displayed on display 106 or any other suitable function as one skilled in the art would readily understand. Other embodiments are described and claimed.

Computing device 100 may comprise an audio device 180 in some embodiments. Audio device 180 may comprise any device capable of generating or detecting tones, music, speech, speech utterances, sound effects, background noise, or other sounds based on received or detected audio data. Examples of audio device 180 may include a microphone, speaker, a multi-speaker system, a home entertainment system, a television, a consumer appliance, a computer system, a mobile device, and a portable electronic media device, among other examples. In some embodiments, audio device 180 may be arranged to generate tones, music, speech, speech utterances, sound effects, background noise, or other sounds based on audio data received from computing device 100 or may be operative to detect tones, music, speech, speech utterances, sound effects, background noise, or other sounds existing outside of computing device 100, such as the spoken voice of a user of the device 100. In some embodiments, audio data may be generated by processor circuit 104. The embodiments are not limited in this context.

In various embodiments, computing device 100 may include one or more integrated devices or one or more input/output (I/O) ports 160 arranged on or as part of enclosure 102. In some embodiments, the one or more integrated input devices 160 may comprise a volume rocker switch or a home button. For example, in some embodiments the computing device 100 may include only one button or switch that is discretely located on a side of enclosure 102. In various embodiments, the single button or switch may be operative to turn the computing device 100 on and off and may also control various other functionality, including operating as a home screen button. While not shown in detail in FIG. 1, some embodiments may include one or more power adapter ports. Other embodiments are described and claimed.

In other embodiments, the one or more I/O ports or devices 160 may be communicatively coupled to the one or more processor circuits 104 to allow for communication with one or more peripheral devices coupled to the one or more I/O ports or devices 160. In various embodiments, the one or more I/O ports or devices 160 may comprise one or more of an Ethernet interface, a Universal Serial Bus (USB) interface, a Thunderbolt® interface, a DisplayPort interface, a MiniDisplayPort (mDP) interface, an audio interface and/or the like. While shown on a particular side of computing device in FIG. 1, it should be understood that the one or more integrated input devices or one or more I/O portions 160 could be arranged anywhere on enclosure 102 and still fall within the described embodiments. Other embodiments are described and claimed. Additional or alternative platform components are discussed in more detail with reference to FIG. 12.

Mobile computing device 100 may include an enclosure 102 in some embodiments. Enclosure 102 may comprise an enclosure, housing, case or other device suitable to support, surround, protect or enclose one or more computing components for computing device 100. For example, enclosure 102 may comprise a rigid plastic or metal body that surrounds or supports one or more computing components for computing device 100. In various embodiments, enclosure 102 may comprise the body or main portion of a tablet computer and may additionally include, support or processor circuit 104, memory 107, one or more wireless transceivers 190 operative to enable wireless communications for the computing device using one or more wireless communication protocols, one or more energy storage modules (not shown), display 106 or any other suitable component of computing device 100. Other embodiments are described and claimed.

In some embodiments, enclosure 102 may be designed to have a thin and sleek form factor in accordance with many modern computing system designs. While the embodiments are not limited in this respect, enclosure 102 may comprise a form factor similar to a tablet computing device in some embodiments. In various embodiments, enclosure 102 may be arranged to support display 106 on front or front side of enclosure 102 as shown in FIG. 1.

In some embodiments, display 106 may comprise any suitable visual interface for displaying content to a user of the mobile computing device 100. In one embodiment, for example, the display 106 may be implemented by a liquid crystal display (LCD) or a touch-sensitive color LCD screen. The touch-sensitive LCD may be responsive to human touch or may be used with a stylus and/or a handwriting recognizer program in some embodiments. In other embodiments, display 106 may comprise a plasma display, light-emitting diode (LED) display or an organic light-emitting diode (OLED) display. Display 106 may comprise a digital touchscreen display arranged to occupy a substantial portion of a first side of a computing device 100 in some embodiments.

While not shown in FIG. 1, mobile computing device 100 may include one or more energy storage modules in some embodiments. The energy storage modules may comprise any device suitable for providing electrical power to computing device 100 in various embodiments. For example, the one or more energy storage modules may comprise a battery or a plurality of batteries or other energy storage devices capable of storing and providing power to computing device 100. In some embodiments, the one or more energy storage modules may comprise cylindrically shaped batteries or flat packed batteries, such as Lithium Ion batteries or any other suitable battery technology. Other embodiments are described and claimed.

In various embodiments, computing device 100 may include a projector adjustment ring 110. In some embodiments, the projector adjustment ring 110 may be integrated into a portion of a perimeter of the enclosure 102 as shown in FIG. 1. The projector adjustment ring 110 may comprise a circular or substantially the projector adjustment ring comprising a circular shape or structure defining a circular opening therein. In some embodiments, a first portion of the projector adjustment ring 110 may be integrated into a portion of the perimeter of the enclosure 102 and a second portion of the projector adjustment ring 110 may be arranged to protrude beyond the perimeter of the enclosure 102. While the projector adjustment ring 110 is shown in FIG. 1 as having approximately half the ring 110 protruding beyond the perimeter of the enclosure 102, the embodiments are not limited in this respect. Additionally, the projector adjustment ring 110 is not limited to the location shown in FIG. 1 and may be arranged at any point around the perimeter of the enclosure 102 or contained wholly within the enclosure 102 in some embodiments.

The projector adjustment ring 110 may comprise a metal, plastic or any other suitable material selected for durability, functionality and, in some embodiments, to enhance the aesthetic appearance of the computing device 100. In various embodiments, the projector adjustment ring 110 may comprise or include a track arranged on an inner circumference 120 of the projector adjustment ring 110 as shown and described in more detail with reference to FIG. 3.

In some embodiments, a projector module 112 may be adjustably coupled to the projector adjustment ring 110. The projector module 112 may be arranged for dual-axis rotation within the projector adjustment ring 110 in various embodiments, as shown and described in more detail with reference to FIG. 3. For example, the projector module 112 may be arranged to rotate in the track arranged on an inner circumference 120 of the projector adjustment ring 110. Additionally, the projector module 112 may also be arranged to pivot around two or more pivot attachment points arranged to couple the projector module 112 to the projector adjustment ring 110. Other embodiments are described and claimed.

The projector module 112 may comprise a semicircular or half-moon shape arranged to occupy half of the opening defined by the inner circumference 120 of the projector adjustment ring 110 in some embodiments. In other embodiments, the projector module 112 may comprise a circular or round shape and may be sized to fill substantially the entire opening defined by the inner circumference 120 of the projector adjustment ring 110. In either embodiment, the projector module 112 may be sized to allow free rotation within the projector adjustment ring 110.

In various embodiments, the coupling of the projector module 112 to the projector adjustment ring 110 may be arranged to provide mechanical resistance selected to allow, responsive to user interaction, the dual-axis rotation of the projector module 112 and to mechanically restrict rotation of the projector module absent user interaction. For example, it may be desirable for the projector module 112 to be adjusted to project or to otherwise focus in a particular direction selected by a user of the computing device 100. In these embodiments, responsive to a reasonable amount of force applied by the user, the projector module 112 may be easily adjusted. Once set, the projector module 112 may be coupled to projector adjustment ring 110 such that sufficient pressure or mechanical force is applied to the projector module 112 to hold it in the desired position and to restrict movement caused by gravity, inertia or any other non-intended or applied force. Other embodiments are described and claimed.

The projector module 112 may comprise or include a projector 114 in some embodiments. For example, the projector 114 may comprise a pico projector or any other suitable small form factor projection device. In some embodiments, a pico projector may comprise a handheld projector or small form factor projector also known as a pocket projector, mobile projector, or mini beamer that applies the use of an image projector in a handheld device. The projector 114 may include but is not limited to one or more light sources, optics, and one or more scanning minors. In various embodiments, the computing device 100 may be operative to turn the image into an electronic signal that drives the light sources with different colors and intensities that when passed through the optics and the minors is projected as a clear image on any viewing surface regardless of the physical characteristics of the viewing surface. The embodiments are not limited in this respect.

In some embodiments, the projector module 112 may comprise or include a camera 116 or any other suitable device capable of recording or capturing still or moving images. In various embodiments, the camera 116 may be included in projector module 112 along with projector 114 and the two devices may be located on a same side of projector module 112. In other embodiments, camera 116 and projector 114 may be located on different sides of projector module 112 to enable viewing of images using the camera 116 in a first direction and projection of images using projector 114 in a second, different direction. In various embodiments, projector module 112 may include a projector 114 and/or camera 116 on two different sides. Other embodiments are described and claimed.

As shown in FIG. 1, in some embodiments display 106 may comprise a rectangular touch sensitive display. A rectangular shaped display 106 may be advantageous from a manufacturing perspective, but to enhance the user experience and aesthetic appeal of the computing device 100, in various embodiments it may be desirable to include a display that covers a more substantial surface area of the front side of enclosure 102. One such embodiment is shown in FIG. 2.

Figure 2:
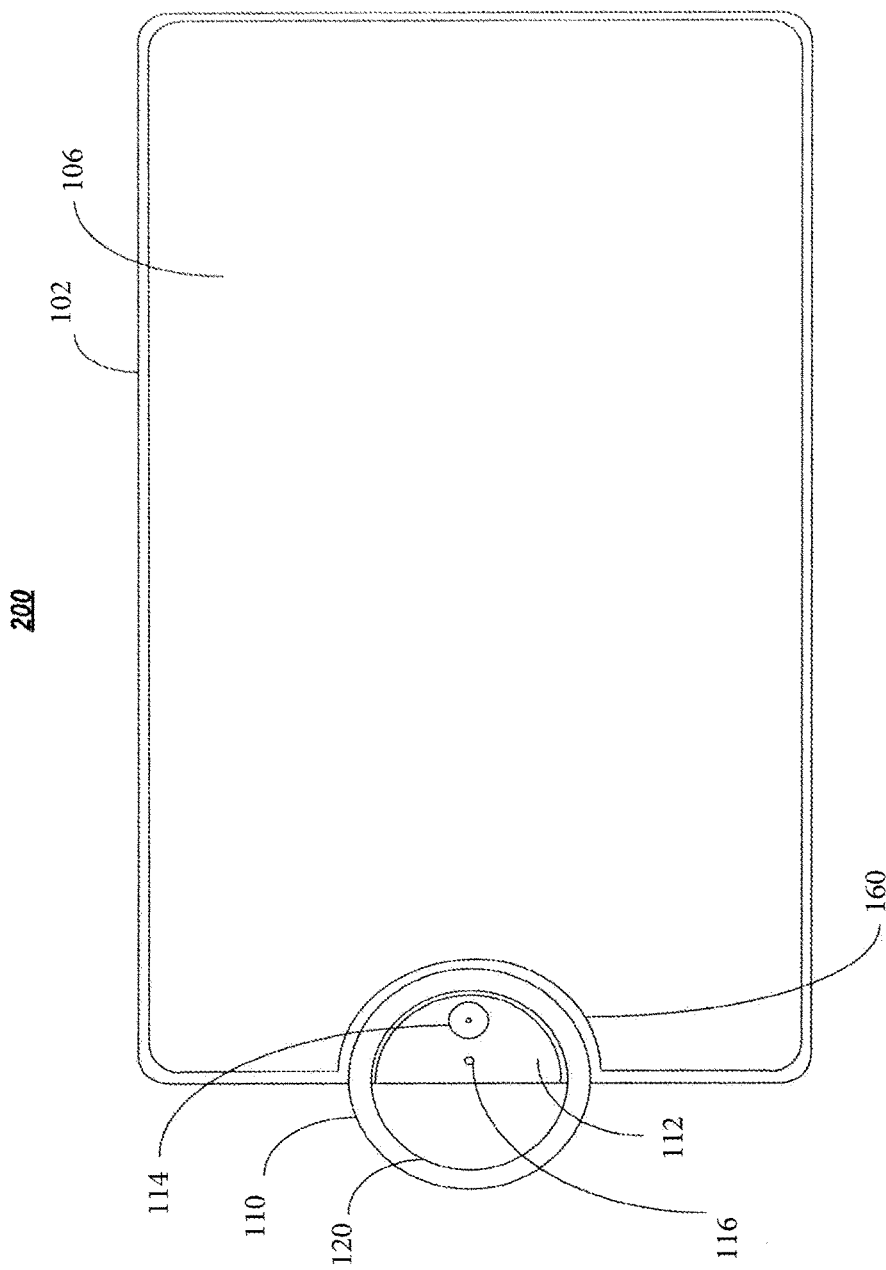
FIG. 2 illustrates one embodiment of a second system.

FIG. 2 illustrates one embodiment of a computing device or system 200. The computing device 200 may comprise a computing device 200 that may be the same or similar to computing device 100 of FIG. 1 where like elements are similarly numbered. In various embodiments, FIG. 2 may illustrate a second front or top perspective view of computing device 200 that includes a touch sensitive display having a semicircular recess 122 on one side arranged to accommodate the projector adjustment ring 110. For example, the display 106 of computing device 200 may comprise a substantially rectangular display on three sides and may include the recess, sized to accommodate the projector adjustment ring 110, on a fourth side. In other embodiments, the recess may be arranged in a corner of the display. Other embodiments are described and claimed.

Returning to FIG. 1, in some embodiments computing device 100 may include projector management module 108. In various embodiments, projector management module 108 may comprise logic or stored instructions operable on processor circuit 104. While shown as being stored in memory 107, the embodiments are not limited in this respect and projector management module 108 may be arranged within computing device 100, including within projector module 112 in some embodiments.

In various embodiments, processor circuit 104 may be operative to execute projector management module 108 which may be operative to control one or more parameters of the projector module 112. For example, projector management module 108 may be operative to control or adjust the zoom, focus or intensity for one or more of projector 114 or camera 116 of projector module 112. In various embodiments, projector management module 108 may be operative to project, using the projector 114 of projector module 112, a virtual keyboard arranged for adaptive typing as shown and described in more detail with reference to FIG. 4. In other embodiments, projector management module 108 may be operative to detect an object in a field of view of the projector module 112 and to adjust one or more graphical user interface elements in response to the detection as shown and described in more detail with reference to FIG. 10. Projector management module 108 may be operative to display a first image on the display 106 and to project a second image using the projector module 112 in some embodiments as shown and described in more detail with reference to FIGS. 8, 9 and 10. Other embodiments are described and claimed.

Figure 3:
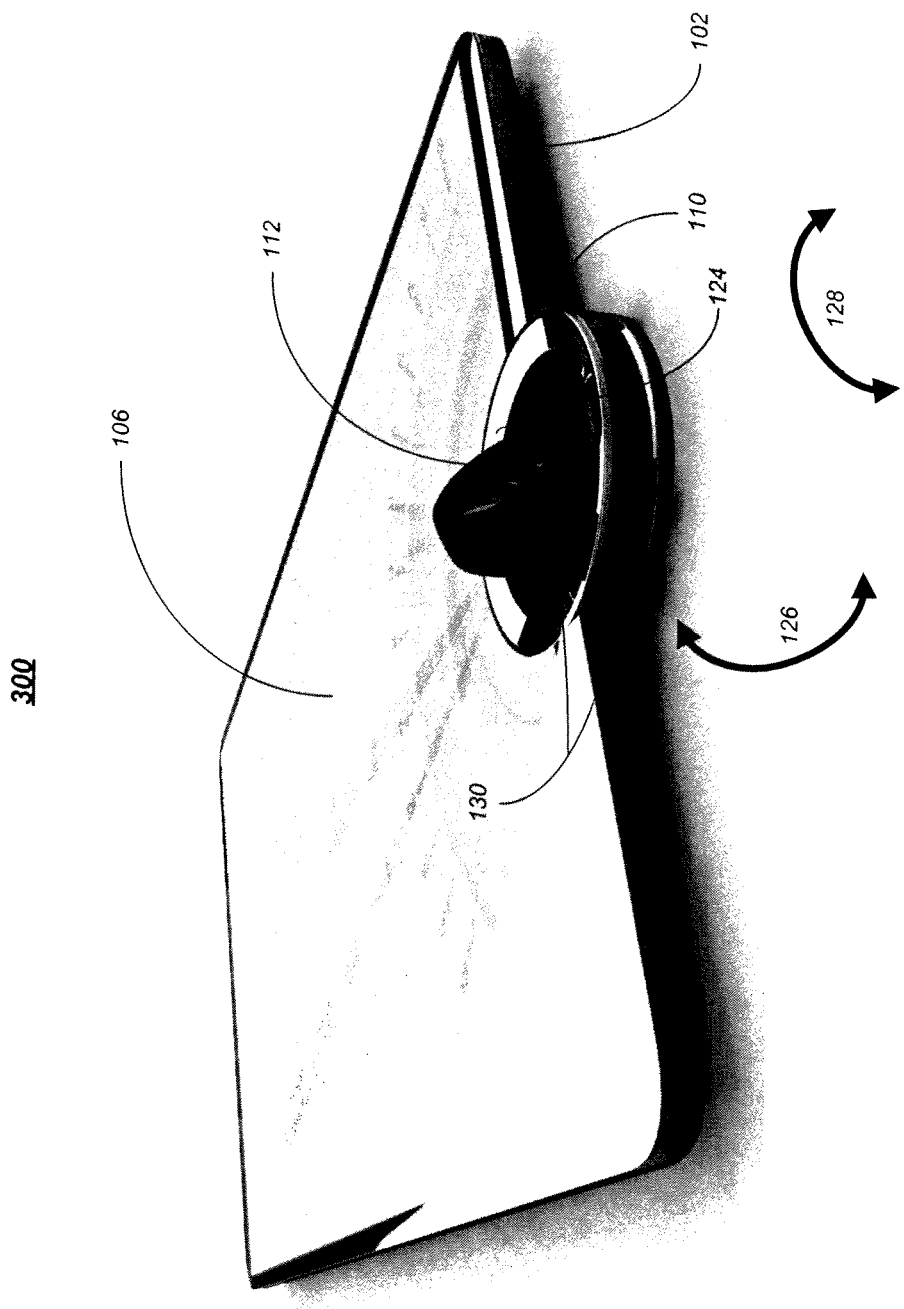
FIG. 3 illustrates one embodiment of a third system.

FIG. 3 illustrates one embodiment of a computing device or system 300. The computing device 300 may comprise a computing device 300 that may be the same or similar to computing device 100 of FIG. 1 and/or computing device 200 of FIG. 2 where like elements are similarly numbered. In various embodiments, FIG. 3 may illustrate a close up perspective view of computing device 300 which more clearly illustrates the projector adjustment ring 110 and the projector module 112. As shown in FIG. 3, the projector module 112 may be arranged for dual-axis, three hundred and sixty degree rotation with projector adjustment ring 110. The embodiments are not limited in this respect.

In various embodiments, projector module 112 may be coupled to or arranged with a portion inside track 124 of projector adjustment ring 110. The coupling may allow for the projector module 112 to rotate a full three hundred and sixty degrees around the circumference of projector adjustment ring 110 as illustrated by rotational/directional arrows 128. In some embodiments, the projector module 112 may also be arranged with two or more pivot attachment points 130 that allow the projector module 112 to flip within projector adjustment ring 110 as illustrated by rotational/directional arrows 126. In this manner, the dual-axis rotational capability of the projector module 112 may allow for the projector module to be aimed in any suitable direction in front, behind, above or below the computing device 300. Other embodiments are described and claimed.

While described herein in terms of a track 124 and pivot attachment points 130, it should be understood that any suitable rotational or coupling mechanism or means could be used to accomplish the same dual-axis rotation and still fall within the described embodiments. Furthermore, while not shown in FIG. 3, in some embodiments the projector adjustment ring 110 may be arranged to rotate to control an adjustment of one or more parameters of the projector module 112. For example, the one or more parameters comprising focus, zoom or intensity for the projector module 112. In these embodiments, the projector adjustment ring 110 may be rotatably coupled or attached to enclosure 102 such that the projector adjustment ring 110 is operative to spin or rotate an adjust the parameters, similar to the turning of a camera lens to adjust focus. The embodiments are not limited in this respect.

Figure 4:
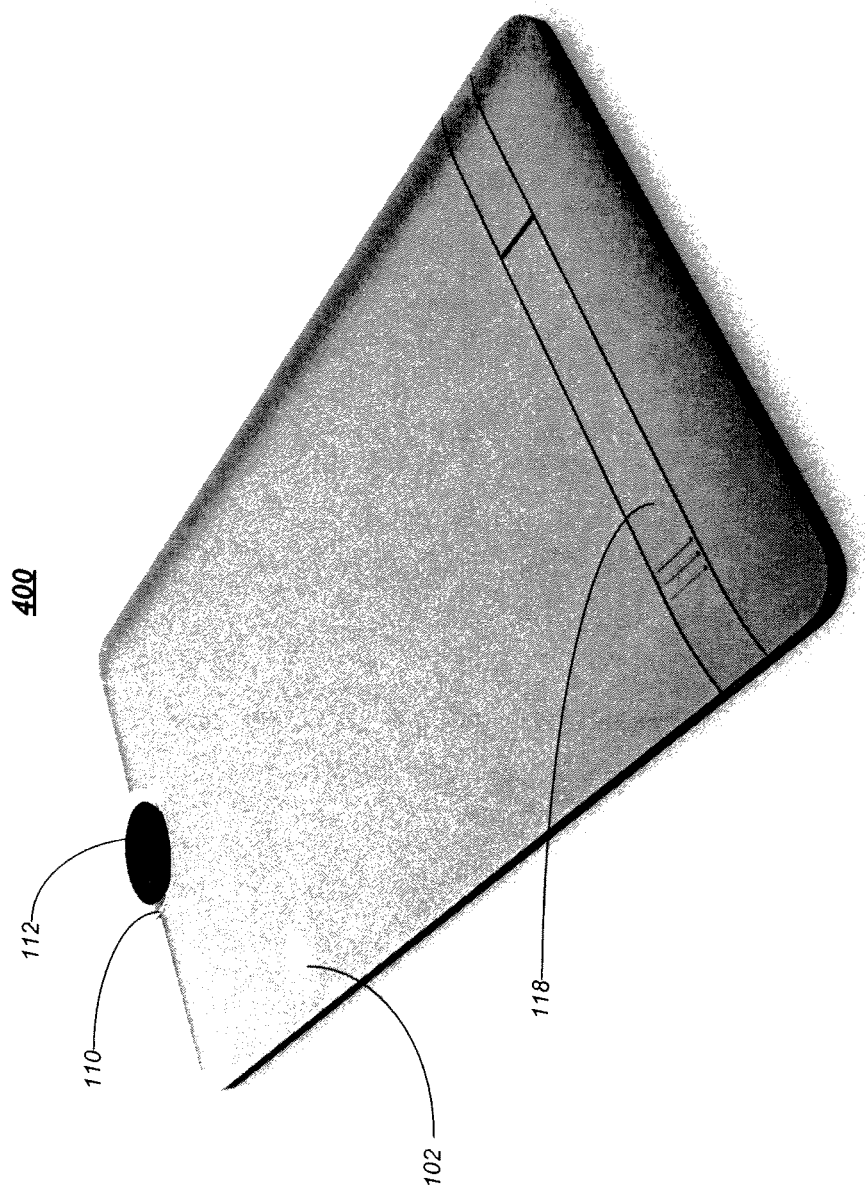
FIG. 4 illustrates one embodiment of a fourth system.

FIG. 4 illustrates one embodiment of a computing device or system 400. The computing device 400 may be the same or similar to computing device 100 of FIG. 1, 200 of FIG. 2 and/or 300 of FIG. 3 where like elements are similarly numbered. In various embodiments, FIG. 4 may illustrate a back perspective view of computing device 400. As shown in FIG. 4, computing device 400 may include or comprise a stand 118 arranged on a back of the enclosure 102. In some embodiments, the stand 118 may be arranged in a closed position as shown in FIG. 4. In the closed position, the stand 118 may rest or nest in a recessed portion of the back of the enclosure 102. In this manner, the back of enclosure 102 may remain substantially smooth or flush when the stand 118 is in the closed position.

Figure 5:
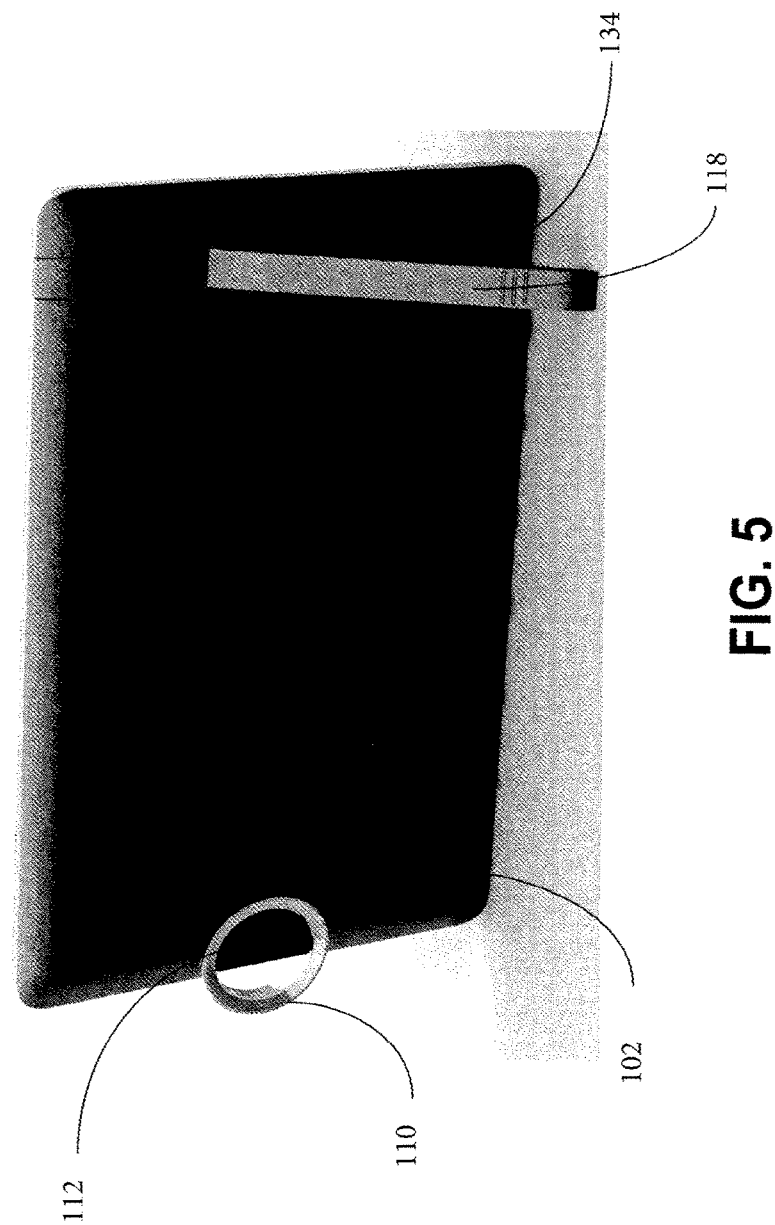
FIG. 5 illustrates one embodiment of a fifth system.

FIG. 5 illustrates one embodiment of a computing device or system 500. The computing device 500 may be the same or similar to hybrid computing device 100 of FIG. 1, 200 of FIG. 2, 300 of FIG. 3 and/or 400 of FIG. 4 where like elements are similarly numbered. In various embodiments, FIG. 5 may illustrate a second back perspective view of computing device 500. As shown in FIG. 5, stand 118 may be arranged to rotate from the closed position in a recessed portion 134 of the back of enclosure 102 as shown in FIG. 4 to an open position as shown in FIG. 5. As shown in FIG. 5, the stand 118 may be arranged to support the enclosure in the open position. Other embodiments are described and claimed.

Figure 6:
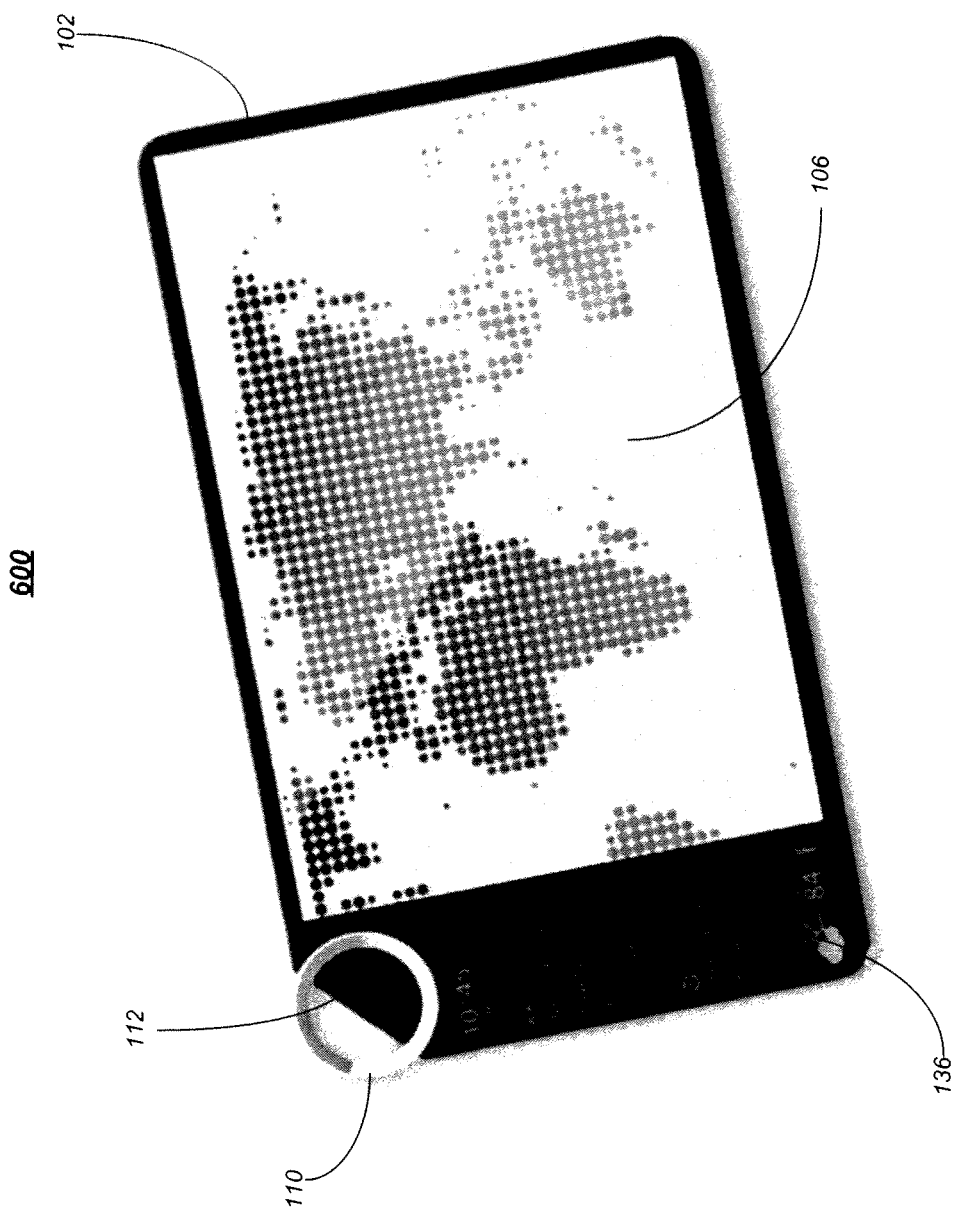
FIG. 6 illustrates one embodiment of a sixth system.

FIG. 6 illustrates one embodiment of a computing device or system 600. The computing device 600 may be the same or similar to computing device 100 of FIG. 1, 200 of FIG. 2, 300 of FIG. 3, 400 of FIG. 4 and/or 500 of FIG. 5 where like elements are similarly numbered. In various embodiments, FIG. 6 may illustrate a front perspective view of computing device 600. As shown in FIG. 6, the projector adjustment ring 110 is not located on the same side as shown in FIGS. 1-5. By way of contrast, the projector adjustment ring 110 is located near a corner of enclosure 102. It should be understood that projector adjustment ring 110 may be located anywhere around the perimeter of or anywhere within enclosure 102 and still fall within the described embodiments.

In various embodiments, placement of the projector adjustment ring 110 in the corner as shown in FIG. 6 may allow for a variant of display options. In some embodiments, the computing device 600 may include two displays 106, 136 that are capable of displaying separate and/or different information. For example, display 106 may comprise a primary display and display 136 may comprise a secondary display arranged to operate as a sidebar to present status information or to present any other relevant information. In other embodiments, the display 106, 136 may comprise a combined display having a cutout to accommodate the projector adjustment ring 110. Other embodiments are described and claimed.

Figure 7:
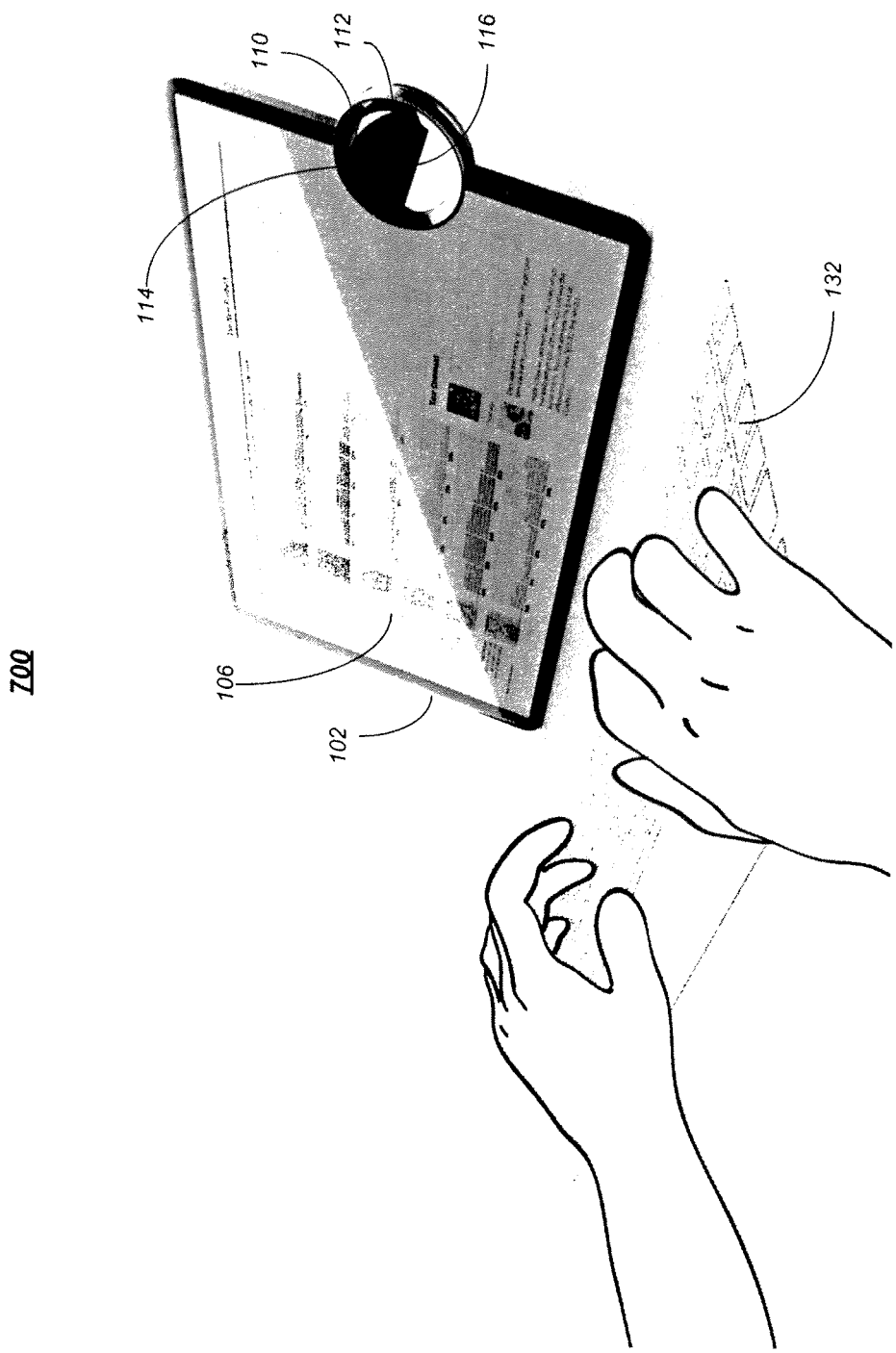
FIG. 7 illustrates one embodiment of a seventh system.

FIG. 7 illustrates one embodiment of a computing device or system 700. The computing device 700 may be the same or similar to computing device 100 of FIG. 1, 200 of FIG. 2, 300 of FIG. 3, 400 of FIG. 4, 500 of FIG. 5 and/or 600 of FIG. 6 where like elements are similarly numbered. In various embodiments, FIG. 7 may illustrate a front perspective view of computing device 700 showing one example of the computing device 700 in operation. As shown in FIG. 7, computing device 700 may be operative to generate a virtual keyboard 132 as shown. In some embodiments, computing device 700 may include a processor circuit operative to execute a projector management module operative to project, using the projector module 112, a virtual keyboard 132 arranged for adaptive typing.

In various embodiments, virtual keyboard 132 may comprise a projected keyboard comprising an input device whereby the image of the virtual keyboard 132 is projected onto surface and when a user's fingers are placed on the projected "keys", the projector management module may be operative to translate the detection into keystrokes. In some embodiments, projector management module may be operative to cause the projector module 112 to use projector 114 to project a visible virtual keyboard 132 onto surface. A sensor or camera, such as camera 116, may be operative to detect movement on or around the virtual keyboard 132 and the detected coordinates may be used to determine actions or characters to be generated.

The virtual keyboard 132 may be generated using laser and infra-red technology to project a hologram of a keyboard 132 on a surface in some embodiments. In various embodiments, the projector module 112 may include a red diode laser as a light source and may project a full size QWERTY layout keyboard. The virtual keyboard size 132 may comprise 295 mm×95 mm and may be projected at a distance of 60 mm from the projector module 112 in some embodiments. In various embodiments, the projector management module may be operative detect up to 400 characters per minute typed on the virtual keyboard 132. Other embodiments are described and claimed.

As shown in FIG. 7, incorporation of the projector adjustment ring 110 and projector module 112 into computing device 700, in addition to display 106, may allow computing device 700 to display a first image on display 106 and a second, different image using projector module 112. In addition, the second image (e.g. the virtual keyboard 132 projected using projector module 112) may be aimed or positioned to ensure a positive user experience. Because of the dual axis adjustability of the projector module 112, the virtual keyboard 132 may be located in locations other than simply directly in front of the computing device 700. For example, if a primary user is presenting information on display 106 to a secondary user, it may be advantageous to place computing device 700 in front of the secondary user while arranging the virtual keyboard 132 in front of the primary user. Other embodiments are described and claimed.

Figure 8:
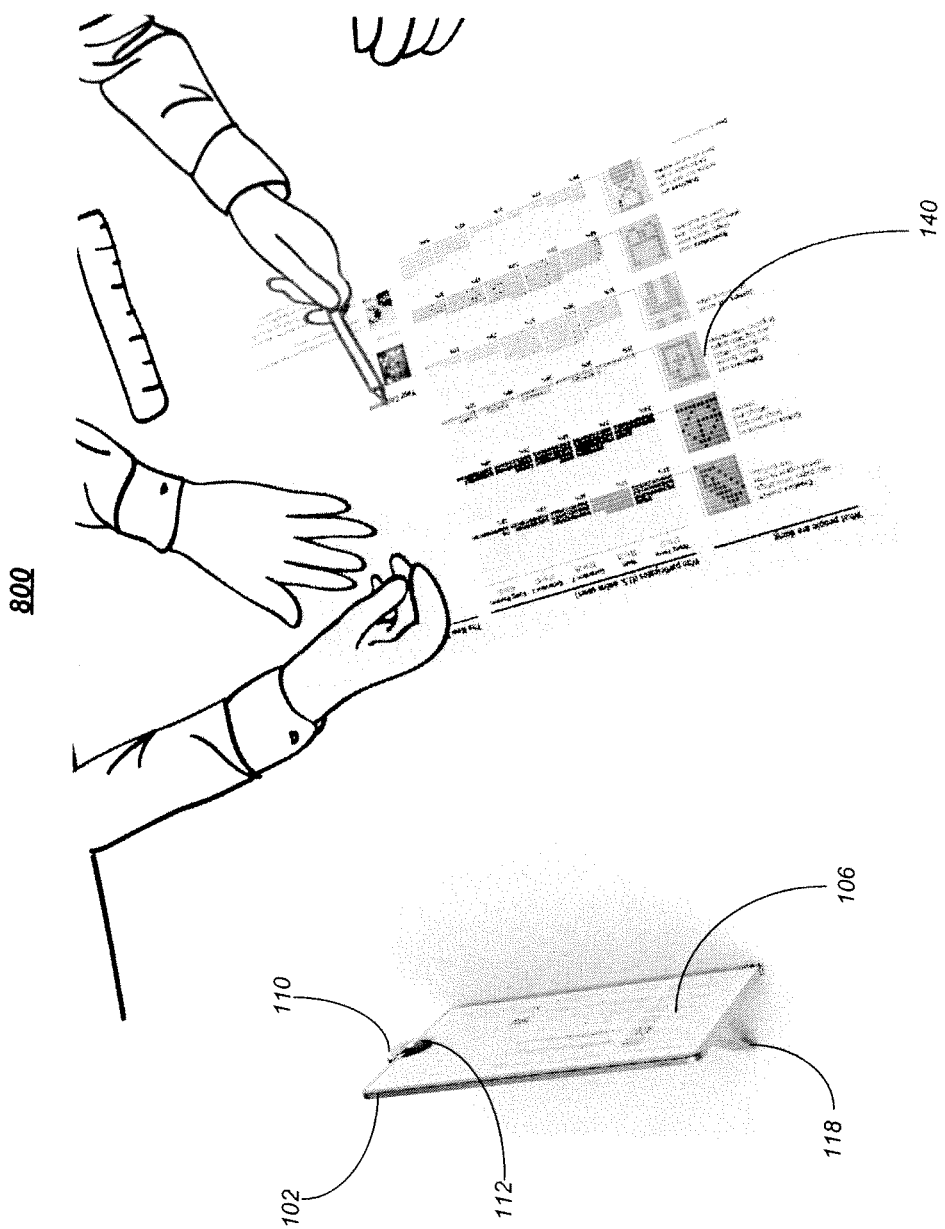
FIG. 8 illustrates one embodiment of an eighth system.

FIG. 8 illustrates one embodiment of a computing device or system 800. The computing device 800 may be the same or similar to computing device 100 of FIG. 1, 200 of FIG. 2, 300 of FIG. 3, 400 of FIG. 4, 500 of FIG. 5, 600 of FIG. 6 and/or 700 of FIG. 7 where like elements are similarly numbered. In various embodiments, FIG. 8 may illustrate a perspective view of computing device 800 showing one example of the computing device 800 in operation. As shown in FIG. 8, computing device 800 may be operative to display a first image 106 on the display 106 and to project a second image 140 using the projector module 112. In some embodiments, the first 106 and second 140 images may comprise the same image. In other embodiments, the first 106 and second 140 images may comprise the same image having different resolution or size. The embodiments are not limited in this respect.

In various embodiments, the first 106 and second 140 images may comprise different images. For example, the projector management module may be operative to display a first image on the display 106 and to project a second image 140 using the projector module 112, where the first 106 and second 140 images are different. In some embodiments, the first 106 or second 140 image may comprise a subset of information related to the other information. For example, a presentation may be projected using projector module 112 and information related to the presentation may be displayed on display 106. Other embodiments are described and claimed.

Figure 9:
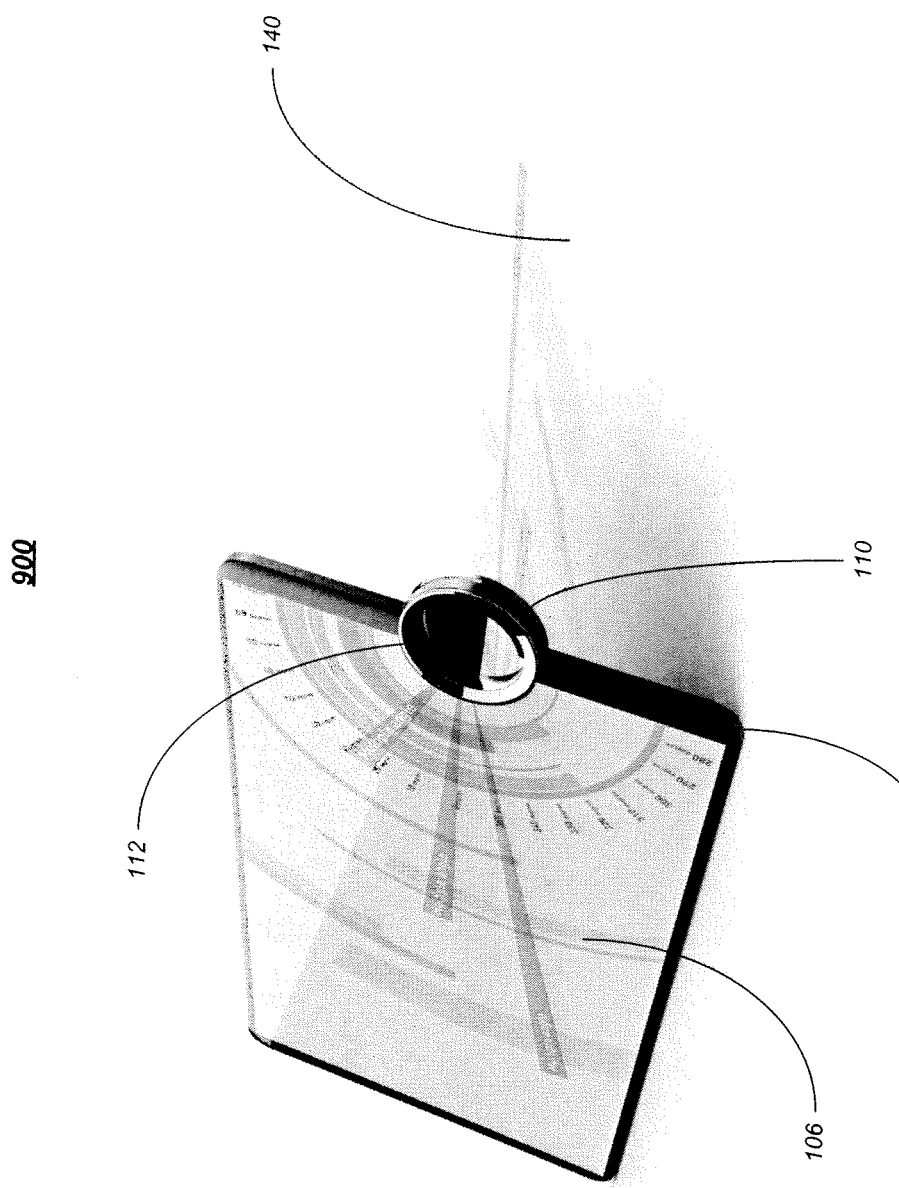
FIG. 9 illustrates one embodiment of a ninth system.

While shown in FIG. 8 as being projected onto a table or desk surface, it should be understood that the second image 140 could be projected anywhere within the range of the projector module 112. For example, in some embodiments the second image 140 may be projected onto a surface, screen or wall located behind the computing device 800, as shown in one embodiment in FIG. 9. FIG. 9 illustrates one embodiment of a computing device or system 900. In various embodiments, the computing device 900 may be the same or similar to computing device 100 of FIG. 1, 200 of FIG. 2, 300 of FIG. 3, 400 of FIG. 4, 500 of FIG. 5, 600 of FIG. 6, 700 of FIG. 7, and/or 800 of FIG. 8 where like elements are similarly numbered.

In various embodiments, FIG. 9 may illustrate a perspective view of computing device 900 showing one example of the computing device 900 in operation. As shown in FIG. 9, computing device 900 may be operative to display a first image 106 on the display 106 and to project a second image 140 using the projector module 112. As shown in FIG. 9, the second image 140 may be projected in any suitable location, including but not limited to behind computing device 900. The location of the projected second image 140 is only limited by the range of the projector module 112 given the dual-axis three hundred and sixty degree rotation of the projector module 112 within the projector adjustment ring 110.

Figure 10:
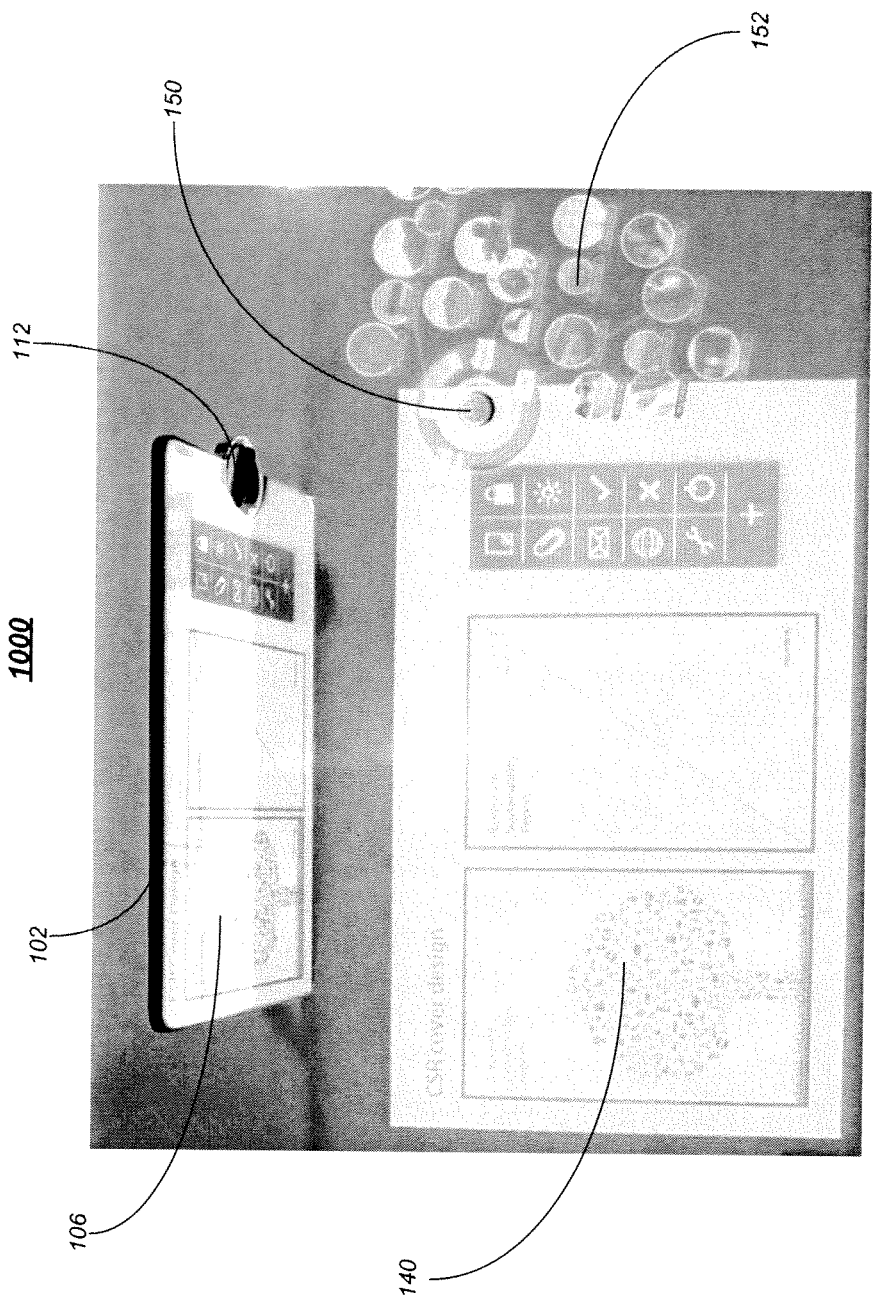
FIG. 10 illustrates one embodiment of a tenth system.

FIG. 10 illustrates one embodiment of a computing device or system 1000. The computing device 1000 may be the same or similar to computing device 100 of FIG. 1, 200 of FIG. 2, 300 of FIG. 3, 400 of FIG. 4, 500 of FIG. 5, 600 of FIG. 6, 700 of FIG. 7, 800 of FIG. 8 and/or 900 of FIG. 9 where like elements are similarly numbered. In various embodiments, FIG. 10 may illustrate a perspective view of computing device 1000 showing one example of the computing device 1000 in operation. As shown in FIG. 10, computing device 1000 may be operative to detect an object 150 in a field of view of the projector module 112 and to adjust one or more graphical user interface elements 152 in response to the detection.

While not limited in this respect, in various embodiments the object 150 may comprise a token associated with computing device 1000. Upon detection of the token 150, projector management module may be operative to alter the projected content 140, such as generating the additional options displayed by graphical user interface (GUI) elements 152. In some embodiments, the projection area may be increased in size in response to detection of the object 150 to allow for the inclusion of the GUI elements 152. These additional elements 152 may add a level of user interaction in some embodiments and may comprise augmented reality information intended to augment other displayed information or real world environment information. For example, the GUI elements 152 may be manipulated by a user, such as dragged and dropped then onto other portions of the projected image 140. Other embodiments are described and claimed.

Operations for various embodiments may be further described with reference to the following figures and accompanying examples. Some of the figures may include a logic flow. A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 11:
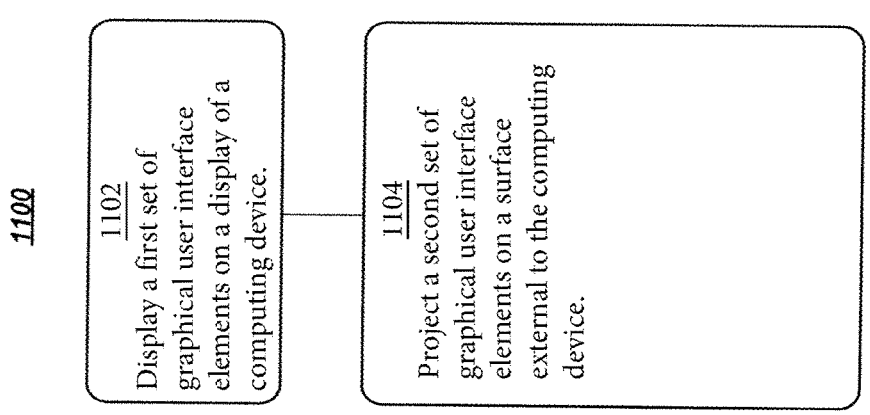
FIG. 11 illustrates one embodiment of a logic flow.

FIG. 11 illustrates embodiments of a logic flow 1100. In various embodiments, the logic flow 1100 may be performed by various systems, nodes, and/or modules and may be implemented as hardware, software, and/or any combination thereof, as desired for a given set of design parameters or performance constraints. For example, the logic flow 1100 may be implemented by one or more of the computing devices described with respect to FIGS. 1-10, a logic device, and/or logic comprising instructions, data, and/or code to be executed by a logic device or processor circuit. For purposes of illustration, and not limitation, the logic flow 1100 is described with reference to FIGS. 1-10. The embodiments are not limited in this context.

In various embodiments, as shown in FIG. 11, a first set of graphical user interface elements may be displayed on a display of a computing device at 1102. For example, display 106 of computing device 100 may be operative to display a first image comprising or including a first set of GUI elements. In some embodiments, a second set of graphical user interface elements may be projected on a surface external to the computing device using a projector module integrated as part of the computing device at 1104. For example, the projector module 112 may be adjustably coupled to a projector adjustment ring 110 and arranged for dual-axis rotation within the projector adjustment ring 110 to allow for projection of a second image in any number of locations as shown, for example, in FIGS. 7-10.

In some embodiments, a virtual keyboard arranged for adaptive typing may be projected by the projector module. For example, virtual keyboard 132 may be projected using projector module 112 as shown in FIG. 7. In other embodiments, an object in a field of view of the projector module may be detected and one or more of the first or second set of graphical user interface elements may be adjusted in response to the detection. For example, as shown in FIG. 10, an object 150 may be detected in the field of view of projector module 112 and, in response to the detect, one or more GUI elements 152 may be adjusted, added, changed or otherwise manipulated. While the adjusting is shown in FIG. 10 as occurring in related to the second image 140, it should be understood that the adjusting could also or alternatively occur with respect to the first image displayed on display 106. Other embodiments are described and claimed.

Figure 12:
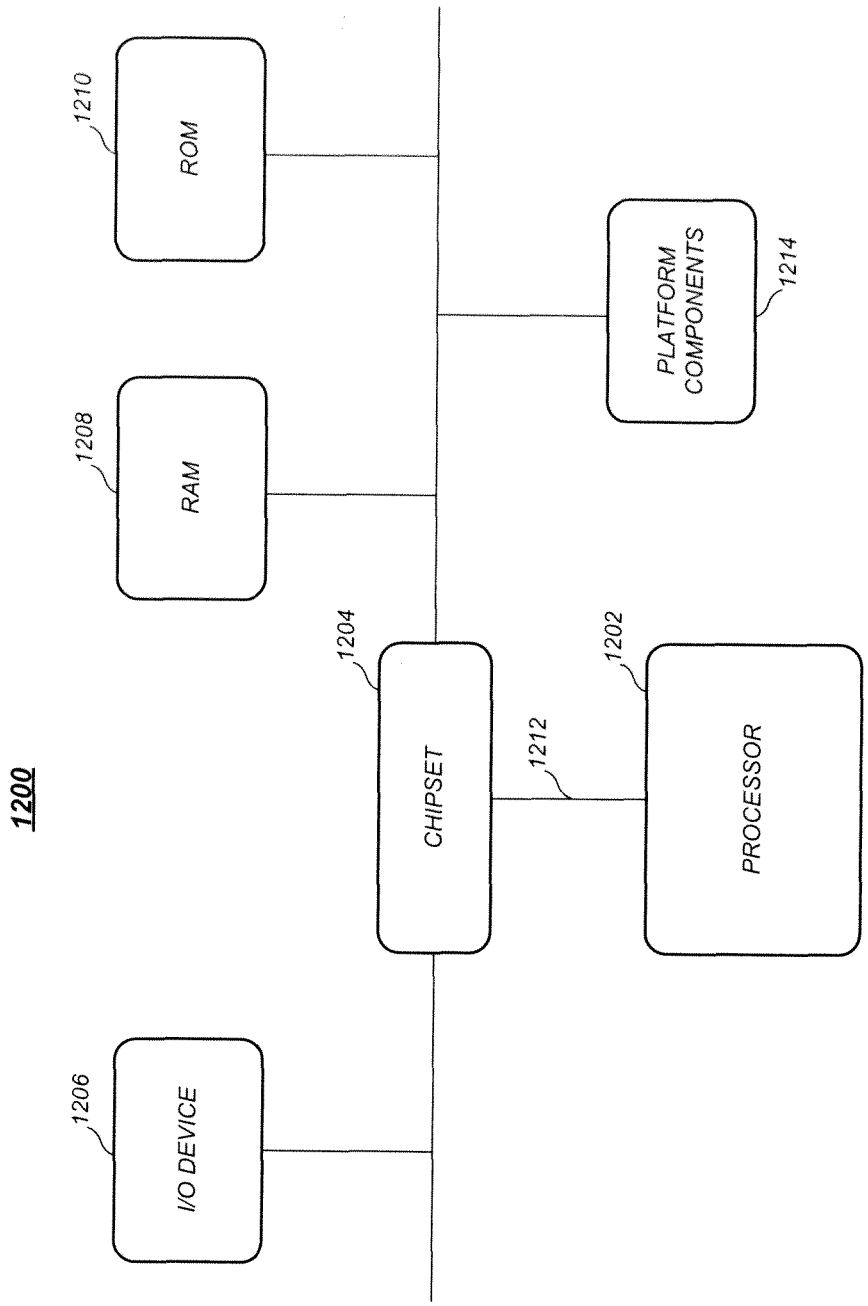
FIG. 12 illustrates one embodiment of an eleventh system.

FIG. 12 is a diagram of an exemplary system embodiment. In particular, FIG. 12 is a diagram showing a system 1200, which may include various elements and may be the same or similar to the computing devices described with reference to FIGS. 1-17. For instance, FIG. 12 shows that system 1200 may include a processor 1202, a chipset 1204, an input/output (I/O) device 1206, a random access memory (RAM) (such as dynamic RAM (DRAM)) 1208, and a read only memory (ROM) 1210, and various platform components 1214 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 12, I/O device 1206, RAM 1208, and ROM 1210 are coupled to processor 1202 by way of chipset 1204. Chipset 1204 may be coupled to processor 1202 by a bus 1212. Accordingly, bus 1212 may include multiple lines.

Processor 1202 may be a central processing unit comprising one or more processor cores and may include any number of processors having any number of processor cores. The processor 1202 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 1200 may include various interface circuits, such as an Ethernet interface and/or a Universal Serial Bus (USB) interface, and/or the like. In some exemplary embodiments, the I/O device 1206 may comprise one or more input devices connected to interface circuits for entering data and commands into the system 1200. For example, the input devices may include a keyboard (physical or virtual/soft), mouse, touch screen, track pad, track ball, isopoint, a voice recognition system, and/or the like. Similarly, the I/O device 1206 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 1200 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design, performance or cost constraints.

Some embodiments may be described using the expression "coupled" and "connected" along with their derivatives.

These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine, processor or processor circuit, may cause the machine, processor or processor circuit to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language A storage medium as described herein may comprise an article of manufacture in some embodiments. In one embodiment, the storage medium may comprise any non-transitory computer readable medium or machine readable medium, such as an optical, magnetic or semiconductor storage. The storage medium may store various types of computer executable instructions, such as instructions to implement one or more logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

In one embodiment, a computing device may comprise an enclosure arranged to support a display on a front of the enclosure, a projector adjustment ring integrated into a portion of a perimeter of the enclosure, and a projector module adjustably coupled to the projector adjustment ring, the projector module arranged for dual-axis rotation within the projector adjustment ring.

In another embodiment, the projector module may comprise a pico projector.

Alternatively, or in addition, in a further embodiment the projector module may be arranged to rotate in a track arranged on an inner circumference of the projector adjustment ring.

Alternatively, or in addition, in a further embodiment the projector module may be arranged to pivot around two or more pivot attachment points arranged to couple the projector module to the projector adjustment ring.

Alternatively, or in addition, in a further embodiment the projector adjustment ring may comprise a circular shape defining a circular opening and the projector module may comprise a semicircular shape arranged to occupy half of the opening defined by an inner circumference of the projector adjustment ring.

Alternatively, or in addition, in a further embodiment the coupling of the projector module and the projector adjustment ring may be arranged to provide mechanical resistance selected to allow, responsive to user interaction, the dual-axis rotation of the projector module and to mechanically restrict rotation of the projector module absent user interaction.

Alternatively, or in addition, in a further embodiment the projector module may comprise a camera.

Alternatively, or in addition, in a further embodiment a stand may be arranged on a back of the enclosure, the stand arranged to rotate from a closed position in a recessed portion of the back to an open position, the stand arranged to support the enclosure in the open position.

Alternatively, or in addition, in a further embodiment the projector adjustment ring may be arranged to rotate to control an adjustment of one or more parameters of the projector module.

Alternatively, or in addition, in a further embodiment the one or more parameters may comprise focus, zoom or intensity for the projector module.

Alternatively, or in addition, in a further embodiment a first portion of the projector adjustment ring may be integrated into a portion of the perimeter of the enclosure and a second portion of the projector adjustment ring may be arranged to protrude beyond the perimeter of the enclosure.

Alternatively, or in addition, in a further embodiment the display may comprise a touch sensitive display having a semicircular recess on one side arranged to accommodate the projector adjustment ring or the display may comprise a rectangular touch sensitive display.

In an additional embodiment, the enclosure may be arranged to support a processor circuit, the processor circuit operative to execute a projector management module operative to control one or more parameters of the projector module.

Alternatively, or in addition, in a further embodiment the projector management module may be operative to project, using the projector module, a virtual keyboard arranged for adaptive typing.

Alternatively, or in addition, in a further embodiment the projector management module may be operative to display a first image on the display and to project a second image using the projector module.

Alternatively, or in addition, in a further embodiment the projector management module may be operative to detect an object in a field of view of the projector module and to adjust one or more graphical user interface elements in response to the detection.

Alternatively, or in addition, in a further embodiment one or more integrated input devices may be arranged on a side of the enclosure.

Alternatively, or in addition, in a further embodiment the display may comprise a touch-sensitive display communicatively coupled to one or more processor circuits.

Alternatively, or in addition, a further embodiment may include one or more sensors comprising one or more of a camera, accelerometer, proximity sensor, light sensor, compass or global positioning system (GPS).

Alternatively, or in addition, in a further embodiment an audio device may be communicatively coupled to the processor circuit.

Alternatively, or in addition, a further embodiment may include one or more wireless transceivers operative to enable wireless communications for the computing device using one or more wireless communication protocols.

In various embodiments, an apparatus may comprise a touch sensitive display, a processor circuit, and a memory unit communicatively coupled to the processor circuit, the memory unit arranged to store a projector management module operative on the processor circuit, the projector management module operative to control one or more parameters of a projector module adjustably coupled to a projector adjustment ring integrated as part of the apparatus, the projector module arranged for dual-axis rotation within the projector adjustment ring.

Alternatively, or in addition, in a further embodiment the projector management module may be operative to project, using the projector module, a virtual keyboard arranged for adaptive typing.

Alternatively, or in addition, in a further embodiment the projector management module may be operative to display a first image on the display and to project a second image using the projector module.

Alternatively, or in addition, in a further embodiment the projector management module may be operative to detect an object in a field of view of the projector module and to adjust one or more graphical user interface elements in response to the detection.

Alternatively, or in addition, in a further embodiment the projector module may comprise a pico projector and a camera.

Alternatively, or in addition, in a further embodiment the projector module may be arranged to rotate in a track arranged on an inner circumference of the projector adjustment ring and to pivot around two or more pivot attachment points arranged to couple the projector module to the projector adjustment ring.

Alternatively, or in addition, in a further embodiment the projector adjustment ring may be integrated into a portion of a perimeter of an enclosure of the apparatus, the projector adjustment ring comprising a circular shape defining a circular opening and the projector module comprising a semicircular shape arranged to occupy half of the opening defined by an inner circumference of the projector adjustment ring.

In some embodiments, a computer-implemented method may comprise displaying a first set of graphical user interface elements on a display of a computing device, and projecting a second set of graphical user interface elements on a surface external to the computing device using a projector module integrated as part of the computing device, the projector module adjustably coupled to a projector adjustment ring and arranged for dual-axis rotation within the projector adjustment ring.

Alternatively, or in addition, in a further embodiment the method may comprise projecting, using the projector module, a virtual keyboard arranged for adaptive typing.

Alternatively, or in addition, in a further embodiment the method may comprise detecting an object in a field of view of the projector module and adjusting one or more of the first or second set of graphical user interface elements in response to the detection.

Alternatively, or in addition, in a further embodiment the projector module may comprise a pico projector and a camera.

Alternatively, or in addition, in a further embodiment the projector module may be arranged to rotate in a track arranged on an inner circumference of the projector adjustment ring and to pivot around two or more pivot attachment points arranged to couple the projector module to the projector adjustment ring.

Alternatively, or in addition, in a further embodiment the projector adjustment ring may be integrated into a portion of a perimeter of an enclosure of the apparatus, the projector adjustment ring comprising a circular shape defining a circular opening and the projector module comprising a semicircular shape arranged to occupy half of the opening defined by an inner circumference of the projector adjustment ring.

Some embodiments may comprise at least one machine readable medium comprising a plurality of instructions that in response to being executed on a computing device cause the computing device to carry out a method according to any of the embodiments described herein.

Various embodiments may comprise an apparatus comprising means for performing the method of any of the embodiments described herein.

Some embodiments may comprise a tablet computing device arranged to perform the method of any of the embodiments described herein. Other embodiments are described and claimed.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
    an enclosure arranged to support a display on a front of the enclosure;
    a projector adjustment ring integrated into a portion of a perimeter of the enclosure, the projector adjustment ring comprising a circular shape defining a circular opening; and
    a projector module disposed at least partially within the circular opening and adjustably coupled to the projector adjustment ring, the projector module arranged for dual-axis rotation within the projector adjustment ring.

2. The computing device of claim 1, the projector module comprises a pico projector.

3. The computing device of claim 1, the projector module arranged to rotate in a track arranged on an inner circumference of the projector adjustment ring.

4. The computing device of claim 1, the projector module arranged to pivot around two or more pivot attachment points arranged to couple the projector module to the projector adjustment ring.

5. The computing device of claim 1, the projector module comprising a semicircular shape arranged to occupy half of an opening defined by an inner circumference of the projector adjustment ring.

6. The computing device of claim 1, the projector module and the projector adjustment ring arranged to provide mechanical resistance selected to allow, responsive to user interaction, the dual-axis rotation of the projector module and to mechanically restrict rotation of the projector module absent user interaction.

7. The computing device of claim 1, the projector module comprising a camera.

8. The computing device of claim 1, comprising a stand arranged on a back of the enclosure, the stand arranged to rotate from a closed position in a recessed portion of the back to an open position, the stand arranged to support the enclosure in the open position.

9. The computing device of claim 1, the projector adjustment ring arranged to rotate to control an adjustment of one or more parameters of the projector module.

10. The computing device of claim 9, the one or more parameters comprising focus, zoom or intensity for the projector module.

11. The computing device of claim 1, a first portion of the projector adjustment ring integrated into a portion of the perimeter of the enclosure and a second portion of the projector adjustment ring arranged to protrude beyond the perimeter of the enclosure.

12. The computing device of claim 1, the display comprising a touch sensitive display having a semicircular recess on one side arranged to accommodate the projector adjustment ring.

13. The computing device of claim 1, the display comprising a rectangular touch sensitive display.

14. The computing device of claim 1, the enclosure arranged to support a processor circuit, the processor circuit operative to execute a projector management module operative to control one or more parameters of the projector module.

15. The computing device of claim 14, the projector management module operative to project, using the projector module, a virtual keyboard arranged for adaptive typing.

16. The computing device of claim 14, the projector management module operative to display a first image on the display and to project a second image using the projector module.

17. The computing device of claim 14, the projector management module operative to detect an object in a field of view of the projector module and to adjust one or more graphical user interface elements in response to the detection.

18. The computing device of claim 1, comprising:
    one or more integrated input devices arranged on a side of the enclosure.

19. The computing device of claim 1, the display comprising a touch-sensitive display communicatively coupled to one or more processor circuits.

20. The computing device of claim 1, comprising:
    one or more sensors comprising one or more of a camera, accelerometer, proximity sensor, light sensor, compass or global positioning system (GPS).

21. An apparatus, comprising:
    a touch sensitive display;
    a processor circuit; and
    a memory unit communicatively coupled to the processor circuit, the memory unit arranged to store a projector management module operative on the processor circuit, the projector management module operative to control one or more parameters of a projector module adjustably coupled to a projector adjustment ring integrated as part of an enclosure of the apparatus, the projector adjustment ring comprising a circular shape defining a circular opening, the projector module disposed at least partially within the circular opening and arranged for dual-axis rotation within the projector adjustment ring.

22. The apparatus of claim 21, the projector management module operative to project, using the projector module, a virtual keyboard arranged for adaptive typing.

23. The apparatus of claim 21, the projector management module operative to display a first image on the display and to project a second image using the projector module.

24. The apparatus of claim 21, the projector management module operative to detect an object in a field of view of the projector module and to adjust one or more graphical user interface elements in response to the detection.

25. The apparatus of claim 21, the projector module comprises a pico projector and a camera.

26. The apparatus of claim 21, the projector module arranged to rotate in a track arranged on an inner circumference of the projector adjustment ring and to pivot around two or more pivot attachment points arranged to couple the projector module to the projector adjustment ring.

27. The apparatus of claim 21, the projector module comprising a semicircular shape arranged to occupy half of an opening defined by an inner circumference of the projector adjustment ring.

28. A computer-implemented method, comprising:
displaying a first set of graphical user interface elements on a display of a computing device; and
projecting a second set of graphical user interface elements on a surface external to the computing device using a projector module integrated as part of the computing device, the projector module adjustably coupled to a projector adjustment ring, the projector adjustment ring comprising a circular shape defining a circular opening and integrated into a portion of a perimeter of the computing device, the projector module arranged for dual-axis rotation within the projector adjustment ring.

29. The computer-implemented method of claim 28, comprising:
projecting, using the projector module, a virtual keyboard arranged for adaptive typing, the projector module comprising a pico projector and a camera.

30. The computer-implemented method of claim 28, comprising:
detecting an object in a field of view of the projector module; and
adjusting one or more of the first or second set of graphical user interface elements in response to the detection;
the projector module arranged to rotate in a track arranged on an inner circumference of the projector adjustment ring and to pivot around two or more pivot attachment points arranged to couple the projector module to the projector adjustment ring the projector module comprising a semicircular shape arranged to occupy half of an opening defined by an inner circumference of the projector adjustment ring.

* * * * *